April 8, 1969      M. M. BECKA ET AL      3,436,781
METHOD OF FABRICATING A SHOE Original Filed Oct. 8, 1965

INVENTORS
Michael M. Becka
Gordon S. Anderson

BY Albert Gordon

ATTORNEY

April 8, 1969 M. M. BECKA ET AL 3,436,781
METHOD OF FABRICATING A SHOE
Original Filed Oct. 8, 1965 Sheet 2 of 2

United States Patent Office 3,436,781
Patented Apr. 8, 1969

3,436,781
METHOD OF FABRICATING A SHOE
Michael M. Becka, Watertown, and Gordon S. Anderson, Framingham, Mass., assignors to Jacob S. Kamborian, Boston, Mass.
Original application Oct. 8, 1965, Ser. No. 494,133. Divided and this application Jan. 22, 1968, Ser. No. 699,705
Int. Cl. A43d 65/00
U.S. Cl. 12—145     8 Claims

ABSTRACT OF THE DISCLOSURE

The fabrication of a shoe by molding an insole to the bottom of a last, lasting an upper to the insole without removing the insole from the last and securing an outsole to the bottom of the lasted shoe.

---

This is a division of application Ser. No. 494,133 filed Oct. 8, 1965.

This invention is concerned with a method for fabricating shoes by injection molding a shoe insole onto the bottom of a last and simultaneously causing the molded insole to become temporarily secured to the bottom of the last, lasting a shoe upper to the molded insole and subsequently securing a shoe bottom unit to the bottom of the lasted shoe, thus eliminating the laborious practice of separately forming and securing the insole to the last bottom in preparation for the remainder of the shoe manufacturing operations.

Figure 5:
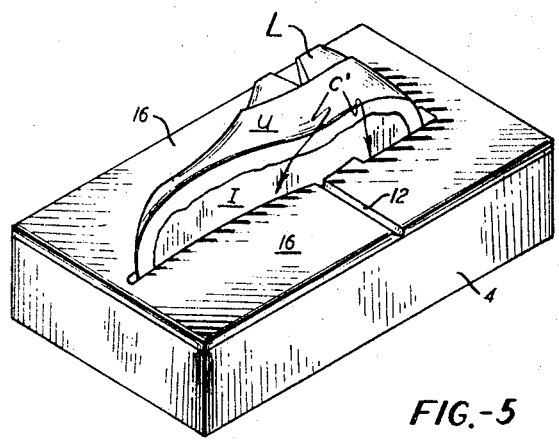
Figure 6:
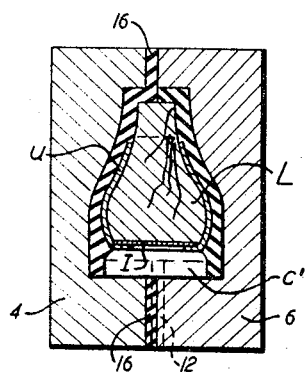

FIGURE 5 is a view of the two-piece mold with the upper mold section removed and having a mold cavity corresponding in shape to that of a finished shoe, there being a last having a lasted upper mounted thereon contained within the lower mold section; and FIGURE 6 is a sectional view of the two piece mold having a mold cavity of a shape corresponding to that of a finished shoe and having a last within an insole located at its bottom and an upper lasted thereto encapsulated between the mold sections.

Figure 1:
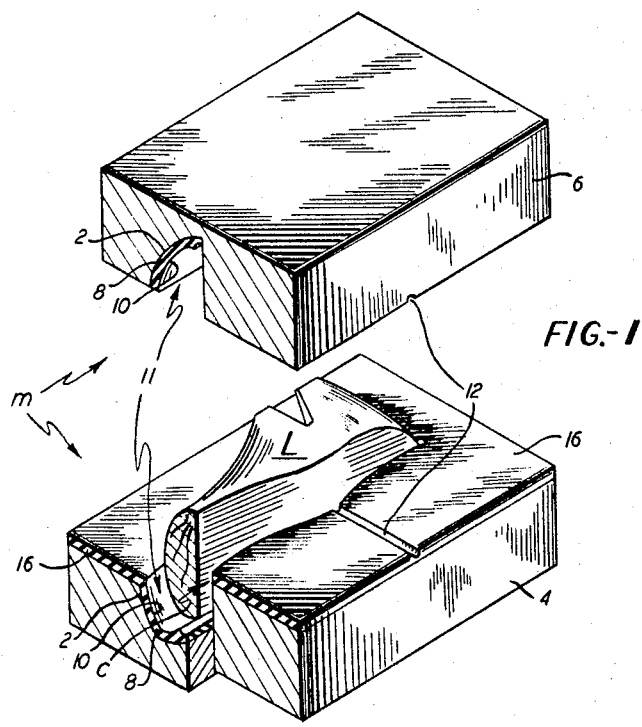
FIGURE 1 is a view of a two piece mold.

FIGURE 1 shows a mold *m* having a major cavity 2 formed therein. The mold *m* is separable into a lower section 4 and an upper section 6 with a portion of the major cavity 2 being formed in each of the adjacent faces of the mold sections so that when the adjacent faces of the mold sections are brought together the complete major cavity 2 is defined. The interior wall of the major cavity is provided with a liner 8 which is bonded or otherwise secured thereto, the inner surface 10 of the liner 8, defining another cavity, hereinafter referred to as the mold cavity 11. The mold cavity 11 has a portion thereof corresponding in shape to that of the workpiece so that the workpiece may be supported within the mold cavity 11 during the molding process in such a manner that a portion of the mold cavity which will hereinafter be referred to as the minor cavity *c*, may remain unoccupied. The minor cavity *c* is thus bounded by a surface of the workpiece, the liner 8, and a surface of the major cavity not covered by the liner. In the instant invention the workpiece is a shoe-shaped member (a last or a last having a shoe upper *u* lasted thereon) and the configuration of the minor cavity *c* corresponds to that of a shoe insole or a shoe outsole. A sprue 12 is located in the mold *m* in such a manner as to communicate the fluent molding material from a source thereof (not shown) to the minor cavity C.

In utilizing the apparatus to fabricate an insole the mold cavity 11 is constructed so as to have a shape corresponding to that of a last L with an insole located at its bottom. The last L lacking an insole is placed in the lower section 4 of the mold *m* where that portion of the liner 8 which is in the lower section 4 is receptive to the last i.e., the mold cavity 11. The upper section 6 of the mold *m* is then placed upon the lower section 4 to thereby encapsulate the last L within the mold cavity 11 and to thus form the insole-shaped minor cavity *c*, one wall of which consists of the bottom of the last L itself. Conventional locating pins (not shown) may be used to insure proper mating of the upper and lower sections of the mold. When the last is properly positioned in the mold, the upper and lower sections thereof are pressed together under increased force and suitable fluent molding material is presented through the sprue 12 into the minor cavity C. The molding material utilized is so constituted as to become secured to the bottom of the last when cured to solidification. In order to permit the mold sections to be pressed together, a sheet 16 of compressible material is interposed between the adjacent faces of the upper and lower sections 6, 4 of the mold.

Figure 2:
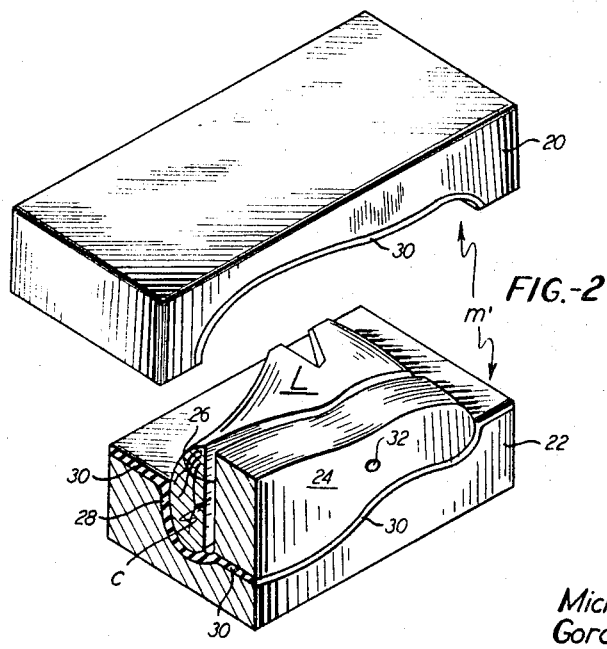
FIGURE 2 is a view of a three piece mold.

Due to the two-part mold construction, the apparatus as shown in FIGURE 1 will produce a shoe sole having a flash line located at its bottom and running lengthwise of the shoe along the line where the mold sections are sealed by the resilient sheet 16. This flash line may be avoided by using a mold having a three-piece construction as opposed to the two-piece construction previously described. Referring to FIGURE 2, the mold *m'* has an upper section 20, a lower section 22 and a third section, hereinafter referred to as the sole plate 24. The sole plate has a surface 26 having a contour corresponding to the contour of the bottom of a shoe sole. The mold sections 20, 22 are so constructed as to accept the sole plate 24 in such a position that the surface 26 of the sole plate 24 will face the bottom of the shoe-shaped member and will thus define a wall of the minor cavity *c*. Means (not shown) are provided for rigidly supporting the sole plate with respect to the upper and lower mold sections 20, 22. The remainder of the mold *m'* is constructed in substantially the same manner as earlier disclosed and illustrated in FIGURE 1, there being a liner 28 provided which is formed from a resilient compressible material. The liner 28 may be provided with extensions 30 as shown in FIGURE 2, to be interposed between the edge of the sole plate 24 and each of the mold sections. Thus when the last L is contained within the mold *m'*, the minor cavity *c* will be defined by the bottom of the last L, the surface 26 of the sole plate 24, and that portion of the liner 28 which spans the gap between the surface 26 of the sole plate 24 and the bottom of the last L. A sprue 32 is formed in the sole plate to allow the fluid molding material to be introduced into the minor cavity *c*.

It is generally desirable, particularly in women's high-heeled shoes, to provide an insole which is rigid from the heel end to the ball break, and relatively flexible from the ball break portion to the toe end. This result may be obtained when the complete insole is to be fabricated in the instant apparatus by constructing the mold so that the minor cavity *c* defines an insole which is thicker at those portions where rigidity is desired and thinner where greater flexibility is required.

Figure 3:
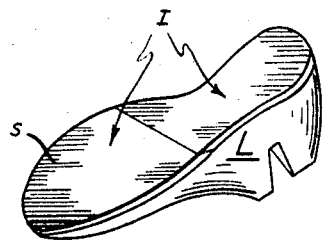
FIGURE 3 is a view of a last having an insole, which was formed according to the instant invention, located at its bottom.
Figure 4:
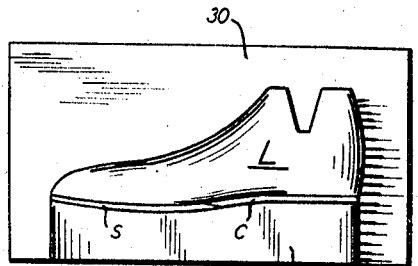
FIGURE 4 is a plan view of the three-piece mold with the upper mold section thereof removed and having a last and a preformed insole segment located within the mold.

The desired varying of insole flexibility may also be obtained by fabricating the insole from a number of components, at least one of which is molded in the aforementioned apparatus. Referring to FIGURE 4, a prefabricated segment s of an insole is located in the minor cavity c, prior to introduction of the fluent molding material thereto. The mold sections are then assembled to encapsulate both the last L and the insole segment s therein whereupon suitable fluent molding material may be introduced into the minor cavity c to fill that portion of the minor cavity c which is unoccupied by the insole segment s. The choice of materials of the insole segment s and the fluent molding material must be such that when the fluent molding material is introduced into the minor cavity c, thus flowing into contact with the insole segment, the two may become bonded to each other to form a contiguous and unitary insole I. The edge of the insole segment s which is to become bonded to the molded insole portion may be beveled to provide a greater bonding area. Thus it may be seen that by fabricating the insole segments and molded portions of the insole from materials possessing the desired characteristics of flexibility, a complete and unitary insole of varying flexibility may be produced. By the way of illustrative example, a fluent molding material known as "Tenite Polyallomer" which is commercially available from Eastman Chemical Products, Inc., Kingsport, Tenn. may be used in conjunction with an insole segment formed from the fibrous material known as "Texon" which is in common use in the fabrication of insoles under existing methods. "Texon" being more resilient than "Tenite Polyallomer," will cause the above fabricated insole to be more flexible at the toe portion than the heel portion thereof. FIGURE 3 is illustrative of a last having an insole I thus formed and located at its bottom.

Referring to FIGURE 5 it may be seen that the apparatus may be used to fabricate a molded shoe bottom unit which comprises an outsole and a heel or an outsole alone, the only modification being that of shaping the contour of the liner to define a mold cavity of a shape corresponding to that of a finished shoe so that when a shoe assembly which includes a last L having a shoe upper u lasted thereon but lacking a shoe bottom unit is contained within the mold cavity 11, the minor cavity c' will be of a shape corresponding to that of a shoe bottom unit and will be defined in part by the bottom of the shoe assembly.

The apparatus as illustrated in FIGURES 5 and 6 may be utilized to fabricate a shoe bottom unit of several components in much the same manner that the aforementioned multi-component insole is formed by inserting a prefabricated component of a shoe bottom unit into the minor cavity c' prior to the introduction of the fluent molding material thereto so that upon such introduction the molded portion of the shoe bottom unit may become secured to the prefabricated portion thereof, thus producing a contiguous and unitary shoe bottom unit.

The herein disclosed apparatus may be used in the fabrication of a completed shoe by forming an insole I as above described either completely from a suitable molding material or from an insole segment s of different composition in conjunction with a molding material, the molding material in either case being of such composition as to become secured to the bottom of the last upon curing to solidification as by permitting the disclosed thermoplastic fluent material to cool to its solid state. The last, with complete and unitary insole I securely located at its bottom as illustrated in FIGURE 3 is then removed from the apparatus and a shoe upper u is then lasted to the insole I by having its margin wiped against the insole bottom in any desired way as, for example, by the arrangement shown in Patent No. 3,130,430. A shoe bottom unit may then be secured to the bottom of the lasted shoe either by conventional means or by utilization of the instant apparatus. By fabricating a shoe in the aforementioned manner there is no need for a skilled workman to manipulate a prefabricated insole with respect to the bottom of the last and subsequently secure the insole thereto in preparation for the lasting operation.

Due to the fact that the mold cavity of the above described apparatus may be fabricated so as to correspond in shape to any type of workpiece, it may be fabricated so as to be receptive to the same last upon which the insole was formed and the upper lasted, an advantage of which is that the common practice of transferring the lasted shoe from the last on which the lasting operation was performed to a second last which is suited for the singular purpose of fabricating a molded outsole or shoe bottom unit, may be eliminated, thus permitting fabrication of a complete shoe on a single last.

We claim:
1. That method of fabricating a shoe which comprises: providing a mold which is combinable with a last to form a mold cavity therewith, said mold cavity corresponding in shape to that of a shoe insole and being defined in part by the bottom of said last; introducing fluent molding material into said mold cavity; curing said molding material to a solidified state to thereby form an insole which is located at the bottom of said last; removing said last with said insole located at the bottom thereof from said mold; draping a shoe upper about said last and insole; and lasting said shoe upper to said insole while said insole is located at the bottom of said last.

2. The method as defined in claim 1 further comprising: securing a shoe bottom unit to the bottom of said lasted shoe.

3. That method of fabricating a shoe which comprises: providing a mold which is combinable with a last to form a mold cavity therewith, said mold cavity corresponding in shape to that of a shoe insole and being defined in part by the bottom of said last; introducing a suitable fluent molding material into said mold cavity; allowing said molding material to cure to its solidified state to thereby form an insole which is secured to said last bottom; removing said secured last and insole from said mold; draping a shoe upper about said last and insole; and lasting said shoe upper to said insole while said insole is secured to said last bottom.

4. The method as defined in claim 3 further comprising: securing a shoe bottom unit to the bottom of said lasted shoe.

5. That method of fabricating a shoe which comprises: providing a mold which is combinable with a last to form an insole-shaped mold cavity therewith, said mold cavity being defined in part by the bottom of said last; locating a component of an insole in a predetermined position within said mold cavity; combining said mold and said last to form said mold cavity, thereby encapsulating said insole component therein; introducing a suitable fluent molding material into said mold cavity to thereby fill that portion of said mold cavity which is unoccupied by said insole component; curing said molding material to a solidified state, thereby causing said insole component to become secured to that portion of said insole which was formed from said fluent molding material whereby a complete and contiguous insole may be formed at the bottom of said last; removing said last with said complete and contiguous insole located at the bottom thereof from said mold; draping a shoe upper about said last and insole; and lasting said shoe upper to said insole while said insole is located at said last bottom.

6. That method as defined in claim 5 further comprising: securing a shoe bottom unit to the bottom of said lasted shoe.

7. That method of fabricating a shoe which comprises: providing a mold which is combinable with a last to form an insole-shaped mold cavity therewith, said mold cavity being defined in part by the bottom of said last; locating a component of an insole in a predetermined position within said mold cavity; combining said mold and said last to form said mold cavity, thereby encapsulating said insole component therein; introducing a suitable fluent molding material into said mold cavity to thereby fill that portion of said mold cavity whcih is unoccupied by said insole component; curing said moldng material to a solidified state, thereby causing that portion of said insole which was formed from said fluent molding material to become secured to said insole component and that portion of said mold cavity which is unoccupied ous insole may be formed at and secured to the bottom of said last; removing said last with said complete and contiguous insole secured thereto from said mold; draping a shoe upper about said last and said insole; and lasting said shoe upper to said insole while said insole is secured to said last bottom.

8. That method as defined in claim 7 further comprising: securing a shoe bottom unit to the bottom of said lasted shoe.

References Cited

UNITED STATES PATENTS

| 3,246,068 | 4/1966 | Ferreira | 264—278 X |
|---|---|---|---|
| 3,272,902 | 9/1966 | Ludwig | 264—244 |
| 3,305,895 | 2/1967 | Ludwig | 264—244 |
| 3,315,288 | 4/1967 | Forma | 12—145 |

ROBERT F. WHITE, *Primary Examiner.*

K. J. HOVET, *Assistant Examiner.*

U.S. Cl. X.R.

18—34, 36; 264—244, 275, 279

UNITED STATES PATENT OFFICE
CERTIFICATE OF CORRECTION

Patent No. 3,436,781                                                 April 8, 1969

Michael M. Becka et al.

It is certified that error appears in the above identified patent and that said Letters Patent are hereby corrected as shown below:

Column 5, line 2, "whcih" should read -- which --; line 3, "moldng" should read -- molding --. Column 5, line 7, "that portion of said mold cavity which is unoccupied" should read -- the bottom of said last whereby a complete and contigu- --.

Signed and sealed this 7th day of April 1970.

(SEAL)
Attest:

Edward M. Fletcher, Jr.                              WILLIAM E. SCHUYLER, JR.
Attesting Officer                                          Commissioner of Patents